May 19, 1931. E. A. GUSTAFSON 1,806,541
SPEEDOMETER DRIVE
Filed May 7, 1927
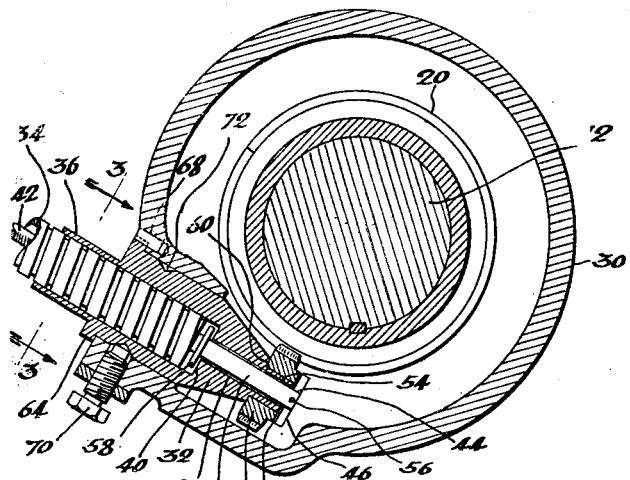
Fig. 2.
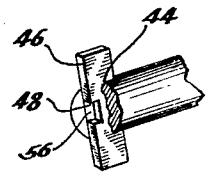
Fig. 4.
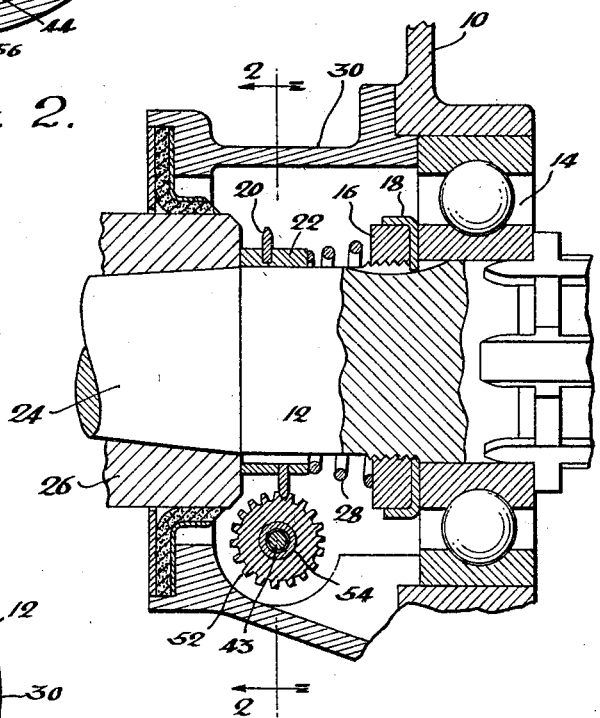
Fig. 3.
Fig. 1.
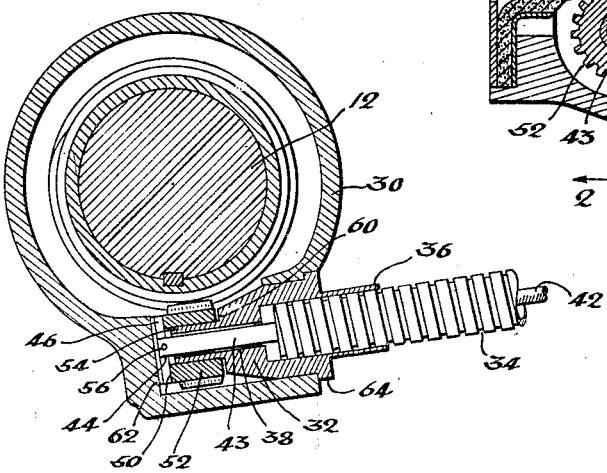
Fig. 5.
Inventor
Edwin A. Gustafson
By Blackmore, Spencer & Hill
Attorneys Patented May 19, 1931

1,806,541

UNITED STATES PATENT OFFICE

EDWIN A. GUSTAFSON, OF FLINT, MICHIGAN, ASSIGNOR TO A C SPARK PLUG COMPANY, OF FLINT, MICHIGAN, A COMPANY OF MICHIGAN

SPEEDOMETER DRIVE

Application filed May 7, 1927. Serial No. 189,557.

My invention relates to an improved speedometer drive of the type commonly used to drive a speedometer from the transmission of a motor vehicle.

Ordinarily at the point where the drive is taken from the transmission, the driven gear is mounted upon a comparatively large shaft and the shaft is journalled in a sleeve or bushing. The shaft has to be large in diameter in order to be strong enough to support the driven gear. Due to the fact that the shaft has to be large the sleeve has to be correspondingly large.

In my invention, I do not mount the driven gear on the shaft but instead it is journalled on the end of the sleeve. This provides the proper bearing area and structural strength while at the same time it permits the use of a much smaller shaft and therefore a smaller sleeve is required. This reduces the size and weight of the supplemental housing which encases the speedometer drive mechanism and provides a much cheaper construction.

With the above and other objects in view, my invention will be more clearly understood by referring to the specification and accompanying drawings, in which, Figure 1 is a longitudinal sectional view through the rear portion of a transmission, showing my improved speedometer drive mechanism associated therewith.

Figure 2 is a section taken on the line 2—2 of Figure 1.

Figure 3 is a section taken on the line 3—3 of Figure 2.

Figure 4 is a detail perspective view showing the manner of securing a key in the end of a shaft.

Figure 5 is a view corresponding to Figure 2 but showing a modified form of speedometer drive.

The numeral 10 is used to designate a transmission casing from which extends the transmission shaft 12 supported by bearing 14. This bearing is held in place by nut 16 and lock washer 18. Mounted on the shaft is a speedometer driving gear 20 which in the particular embodiment illustrated is a single tooth gear made from a stamping about which is cast a hub portion 22. The end of the shaft 12 is tapered as at 24 and a universal joint flange 26 is held upon this portion in the usual manner. A spring 28 serves to urge the gear 20 against the universal joint flange.

Secured to the transmission casing is a supplementary housing 30 adapted to receive a sleeve 32. A flexible tube 34 is held in the sleeve by means of tubular portion 36 which may be prick punched to engage the tube. The sleeve is provided with a smaller passage 38 and a shoulder 40. A flexible shaft 42, free to revolve inside the tube 34 having an end portion 43 secured to it, extends through the passage 38 and is provided at its end with a slot 44 to receive a key 46 having a cut-away portion 48. This key engages a slot 50 in a gear 52 which is journalled on portion 54 of the sleeve. After the parts have been assembled, the end portion 43 is prick punched as at 56 into the cut-away portion 48 of the key 46 to hold the latter in place. It will be seen that the gear 52 is supported directly on the sleeve rather than on the shaft as is usually the case. This permits the use of a small shaft and sleeve while at the same time providing a large area of bearing surface for the gear.

The shaft 42 is provided with a flange 58 which may be an integral part or may be a split washer sprung into a groove. This cooperates with the shoulder 40 to limit the axial movement of the shaft in the one direction, while the gear 52 abuts against the shoulder 50 on the sleeve to limit axial movement in the opposite direction. In the form shown in Figure 5, the gear 52 abuts against portion 62 to limit the axial movement in the one direction. In this form the flange 58 may be dispensed with.

It is sometimes necessary to be able to vary the distance between the centers of gear 20 and gear 52 so that a different ratio may be obtained to suit the particular rear axle gears or tires which are being used on the vehicle. To permit this, the tube 34 is mounted eccentrically in the sleeve and a flange 64 is provided with a plurality of notches 66 which may engage a pin 68 held in the housing 30. The notches may be numbered in accordance with the number of teeth in the gear 52 which is to be used. In assembling, to get a desired ratio it is merely necessary to rotate the sleeve until the notch bearing the same number as that on the gear 52, is adjacent the pin 68, and then push the sleeve in until the flange 64 engages the housing 30. When this is done, the proper center distance is automatically provided. A set screw 70 threaded into the housing 30 engages a notch 72 in the sleeve to prevent axial or rotary movement of the latter.

It is though from the foregoing taken in connection with the accompanying drawings that the construction and operation of the device will be apparent to those skilled in the art, and that various changes in size, shape, and proportion and details of construction may be made without departing from the spirit and scope of the appended claims.

I claim:

1. An instrument drive comprising, in combination, a flexible shaft, a flexible tube encasing said shaft, a sleeve secured to the end of said tube, said shaft passing through said sleeve, and a gear journalled on the end of said sleeve in concentric relation to said shaft, said gear and said shaft being connected in driving engagement.

2. An instrument drive comprising, in combination, a flexible shaft, a flexible tube encasing said shaft, a sleeve secured to the end of said tube, said shaft passing through said sleeve, a gear journalled on the end of said sleeve in concentric relation to said shaft, said gear being provided with a slot, and a key fitting in said slot, said key being secured to said shaft.

3. An instrument drive comprising in combination, a transmission casing, a shaft protruding from said casing, a driving gear on said shaft, a housing encasing said gear, a sleeve supported in said housing, and a driven gear journalled eccentrically on said sleeve, said sleeve being angularly adjustable in said housing to vary the distance between the centers of said driving and driven gears.

4. An instrument drive comprising, in combination, a housing, a shaft rotatable within the housing, a driving gear on said shaft, a sleeve supported in said housing, a driven shaft extending through said sleeve, a driven gear journalled on said sleeve in concentric relation to said driven shaft, and means to effect a driving connection between said driven gear and said driven shaft.

5. An instrument drive comprising, in combination, a housing, a shaft rotatable within said housing, a driving gear on said shaft, a sleeve supported in said housing, a flexible shaft extending through said sleeve, a flexible tube encasing said shaft and connected to said sleeve, a driven gear journalled on said sleeve in concentric relation to said flexible shaft, and means to effect a driving connection between said driven gear and said flexible shaft.

In testimony whereof I affix my signature.

EDWIN A. GUSTAFSON.